(12) United States Patent
Wei et al.

(10) Patent No.: US 11,343,784 B2
(45) Date of Patent: May 24, 2022

(54) SYNCHRONIZATION AND BROADCAST SIGNAL DESIGN FOR 5G

(71) Applicant: FUJITSU LIMITED, Kawasaki (JP)

(72) Inventors: Xusheng Wei, Staines (GB); Timothy Moulsley, Caterham (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/533,279

(22) Filed: Aug. 6, 2019

(65) Prior Publication Data

US 2019/0364523 A1 Nov. 28, 2019

Related U.S. Application Data

(63) Continuation of application No. PCT/EP2018/051761, filed on Jan. 24, 2018.

(30) Foreign Application Priority Data

Mar. 10, 2017 (EP) .................................... 17160353

(51) Int. Cl.
*H04W 56/00* (2009.01)
*H04W 76/11* (2018.01)
(Continued)

(52) U.S. Cl.
CPC ......... *H04W 56/001* (2013.01); *H04W 48/10* (2013.01); *H04W 72/046* (2013.01); *H04W 72/0446* (2013.01); *H04W 76/11* (2018.02)

(58) Field of Classification Search
CPC ... H04W 56/001; H04W 76/11; H04W 48/16; H04W 48/10; H04W 72/0446;
(Continued)

(56) References Cited

U.S. PATENT DOCUMENTS

2014/0120926 A1 5/2014 Shin et al.
2014/0162704 A1 6/2014 Choi et al.
(Continued)

FOREIGN PATENT DOCUMENTS

JP 201541818 A 3/2015
WO 2015025839 A1 2/2015
(Continued)

OTHER PUBLICATIONS

NTT DOCOMO., "New SID Proposal: Study on New Radio Access Technology," 3GPP TSG RAN Meeting #71 RP-160671, Göteborg, Sweden, Mar. 7-10, 2016.
(Continued)

*Primary Examiner* — Lan N Moore
*Assistant Examiner* — Sun Jong Kim
(74) *Attorney, Agent, or Firm* — Myers Wolin, LLC.

(57) ABSTRACT

A 5G wireless communication system to transmit a beam ID or part of a beam ID by joint design of a secondary synchronization sequence (SSS) and Physical Broadcast Channel (PBCH). In 5G during the initial access procedure a terminal will try to obtain fundamental system information/identifiers which are required for future signal transmission/reception activities. Due to the extensive usage of beamforming techniques in 5G, besides identifying a cell ID and obtaining time/frequency synchronization, the terminal may identify a beam ID during the initial access procedure. Therefore, a beam ID is transmitted as part of synchronization signals (SS) broadcast by a gNB, more particularly as part of SSS or as part of PBCH. The synchronization signals may be transmitted as a set of SS blocks, each having an index, which may be a time index, for facilitating identification.

15 Claims, 7 Drawing Sheets

(51) Int. Cl.
*H04W 48/10* (2009.01)
*H04W 72/04* (2009.01)

(58) Field of Classification Search
CPC ........... H04W 56/0015; H04W 56/005; H04W 72/04; H04W 72/0406
See application file for complete search history.

(56) References Cited

U.S. PATENT DOCUMENTS

| | | | |
|---|---|---|---|
| 2014/0192786 A1* | 7/2014 | Skov | H04W 56/0015 370/336 |
| 2015/0304868 A1* | 10/2015 | Yu | H04B 7/0617 370/312 |
| 2016/0360463 A1 | 12/2016 | Kim | |
| 2017/0111886 A1* | 4/2017 | Kim | H04W 48/14 |
| 2019/0222288 A1* | 7/2019 | Zhou | H04L 5/0023 |
| 2019/0281563 A1* | 9/2019 | Lee | H04B 7/0617 |
| 2020/0296765 A1* | 9/2020 | Kim | H04W 74/0833 |

FOREIGN PATENT DOCUMENTS

| | | |
|---|---|---|
| WO | 2015093892 A1 | 6/2015 |
| WO | 2016210302 A1 | 12/2016 |
| WO | 2018162143 A1 | 9/2018 |

OTHER PUBLICATIONS

The extended European search report including the Annex to the European search report and European search opinion issued by the European Patent Office for corresponding European Patent No. 17160353.3 dated Sep. 20, 2017.

Guangdong OPPO Mobile Telecom, "Discussion on multi-beam based initial access for NR," Agenda Item: 7.1.2.1, 3GPP TSG RAN WG1 Meeting #87, R1-1611701, Reno, USA, Nov. 14-18, 2016.

LG Electronics, "Discussion multi-TRP operation considering analog beamforming," Agenda Item: 7.1.2.4, 3GPP TSG RAN WG1 Meeting #87, R1-1611793, Reno, USA, Nov. 14-18, 2016.

International Search Report and Written Opinion issued by the International Searching Authority for corresponding International Patent Application No. PCT/EP2018/051761, dated Mar. 1, 2018.

Cohere Technologies, "SS Block Composition, SS Burst Set Composition and SS Time Index Indication," Agenda item: 8.1.1.1.2, 3GPP TSG-RAN Meeting #88bis, R1-1705459, Spokane, USA, Apr. 3-7, 2017.

3GPP TS 38.211,V15.0.0, 3rd Generation Partnership Project; Technical Specification Group Radio Access Network NR; Physical channels and modulation (Release 15), Valbonne, France, Dec. 2017.

3GPP TS 38.213, V15.0.0, 3rd Generation Partnership Project; Technical Specification Group Radio Access Network NR; Physical layer procedures for control (Release 15), Valbonne, France, Dec. 2017.

Sung et al., "Fast Intra-Beam Switching Scheme using Common Contention Channels in Millimeter-wave based Cellular Systems,", ICACT Transactions on Advanced Communications Technology (TACT) vol. 5, Issue 1, Jan. 2016.

Notice of Reasons for Refusal issued by the Japan Patent Office for corresponding Japanese patent application No. 2019-541459 dated Aug. 18, 2020, with a full machine English translation.

Spreadtrum Communications, "Indication of the SS-block index in multi-beam cases," 3GPP TSG RAN WG1 AH_NR Meeting, Agenda Item: 5.1.1.1.1, R1-1700288, Jan. 16-20, 2017, Spokane, USA.

LG Electronics, "NR PBCH Design" 3GPP TSG RAN WG1 NR Ad-Hoc Meeting, Agenda Item: 5.1.1.2., R1-1700460, Jan. 16-20, 2017, Spokane, USA.

* cited by examiner

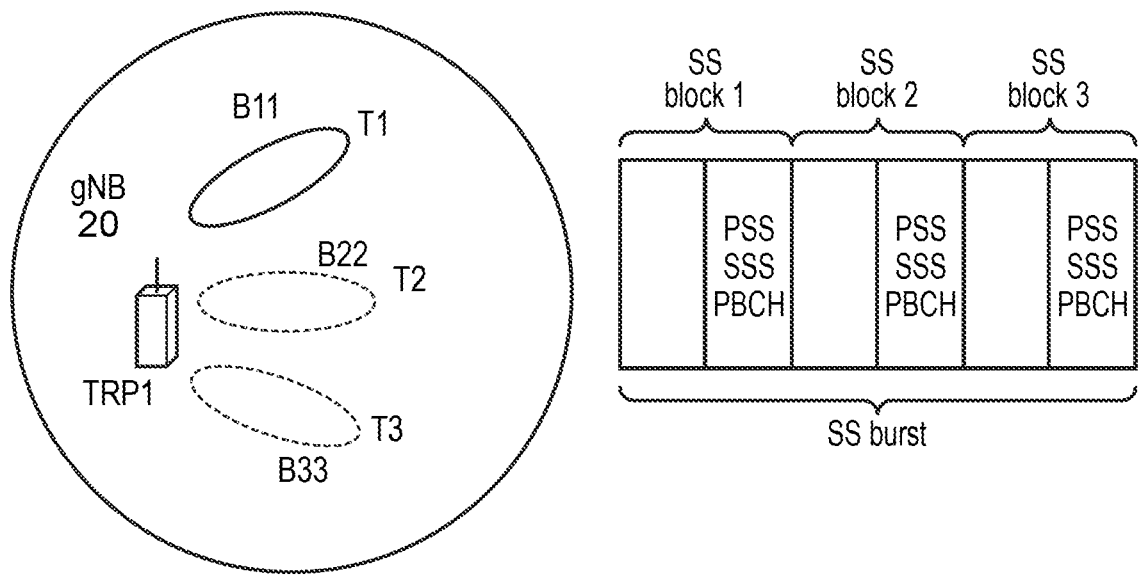
FIG. 3
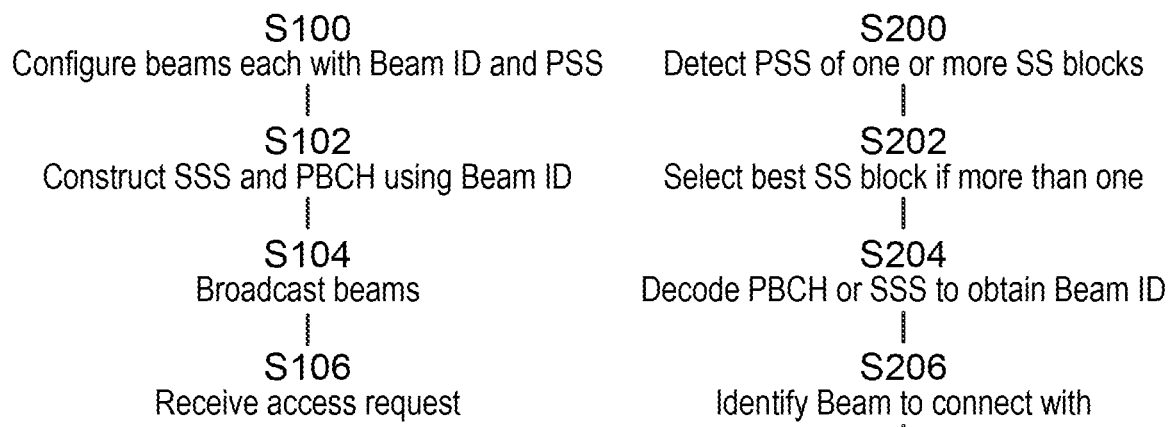
FIG. 4
FIG. 5

SYNCHRONIZATION AND BROADCAST SIGNAL DESIGN FOR 5G

CROSS REFERENCES TO RELATED APPLICATIONS

This application is a continuation application of International Patent Application No. PCT/EP2018/051761, filed Jan. 24, 2018, and claims priority to European Patent Application No. EP17160353.3 filed Mar. 10, 2017 the contents of each are herein wholly incorporated by reference.

FIELD OF THE INVENTION

The present invention relates to a wireless communication method in which terminals connect to cells in a wireless network. The present invention further relates to a wireless communication system, a transmission point, a station (e.g. terminal) and a wireless communication system.

Particularly, but not exclusively, the present invention relates to techniques for designing synchronization signals and broadcast channels in a "5G" wireless communication system.

BACKGROUND OF THE INVENTION

Wireless communication systems are widely known in which terminals (also called user equipments or UEs, subscriber or mobile stations) communicate with base stations (BSs) within communication range of the terminals.

At a given carrier frequency the different geographical areas served by one or more base stations are generally referred to as cells. A base station may control one or more transmission (and/or reception) points and each transmission point may support one or more cells. Typically many transmission points are provided in appropriate locations so as to form a network covering a wide geographical area more or less seamlessly with adjacent and/or overlapping cells. (In this specification, the terms "system" and "network" are used synonymously). For each cell a base station, which provides or at least manages the transmission point, divides the available bandwidth, i.e. frequency and time resources, into individual resource allocations for the user equipments served by the cell. In this way, a signal transmitted in a cell and scheduled by the base station has a specific location in the frequency and time domains. The terminals are generally mobile and therefore may move among the cells, prompting a need for handover of the connection of the terminal to the network as the terminal moves between adjacent cells. A terminal may be in range of (i.e. able to detect signals from and/or communicate with) several cells at the same time, but in the simplest case it communicates with one "serving" cell.

In current, "4G" systems, also known as LTE or LTE-A, a terminal has to perform cell search and synchronization in order to connect to a cell. For this purpose, each cell broadcasts synchronization signals referred to as the Primary Synchronization Signal (PSS) and Secondary Synchronization Signal (SSS). These signals establish a timing reference for the cell, and carry a physical layer cell identity and physical layer cell identity group for identifying the cell. These kinds of signals are referred to below as "synchronization signals".

In an LTE system, in the frequency domain, transmissions occur within at least one frequency span (frequency band) occupying a range of frequencies defined by a start frequency and an end frequency. The range of frequencies used to provide a given cell are generally a subset of those within a given frequency span. In the time domain, transmission is organized in "frames" which are subdivided into "subframes". In one frame structure used in LTE, a 10 ms frame is divided into 10 subframes each of 1 ms duration. PSS/SSS can indicate to a terminal the timings of frame boundaries, i.e. timings where frames stop and start. In LTE, each of the PSS and SSS is transmitted twice per frame, in other words with a 5 ms periodicity (and consequently, only in some subframes). For example, PSS and SSS are both transmitted on the first and sixth subframe of every frame within the frame structure.

In LTE specifications, a terminal can be considered as either synchronised or unsynchronised with respect to a cell. Successfully decoding the PSS and SSS allows a terminal to obtain synchronization information, including downlink (DL) timing and cell ID for a cell; in other words the terminal (or at least some aspects of the operation of the terminal) can become "synchronized" with the timing of signals associated with the cell. In the synchronized state, the terminal can decode system information contained in a Physical Broadcast Channel (PBCH) broadcast by the cell. The terminal can then begin to receive user data (packets) on a downlink from the cell, and/or, typically after some further protocol steps, transmit user data on an uplink (UL) to the cell.

Terminals need to measure each communication channel between itself and a given cell in order to provide appropriate feedback to that cell. To facilitate measurements of the channel by terminals, reference signals are transmitted by the cells. Various kinds of reference signal (or symbol) are provided in LTE, including the Common Reference Signal (CRS), which is cell specific and intended to be available to all terminals in a cell.

Nowadays mobile access to the Internet or other communications networks is becoming a crucial necessity for both business and personal life and there are significant challenges to the current wireless systems due to the popularity of new applications such as social networking, cloud based services and big data analysis. With the forthcoming services such as Internet of things and ultra-reliable, mission-critical connections, a next-generation radio access system to succeed LTE/LTE-A and known as "5G" or "NR" (New Radio) will be needed to satisfy all those demanding requirements.

Simultaneous requirements to be met comprise greatly increased traffic loads; many more devices; reduced latency; low-power and low-cost solutions for Machine-to-Machine (M2M) devices; and increased peak and guaranteed data rates. The intention of 5G is to satisfy all requirements of these applications and ideally, 5G could provide at least the following features:

Ultra-reliable connection in addition to higher data rate, higher capacity and higher spectral efficiency Unified user experience together with significant reduction on latency Scalability/adaptability to applications with significant different Quality of Service (QoS) requirements Access all spectrum and bands and support different spectrum sharing schemes From the properties of traffic profiles point of view, it is expected that 5G will support three profiles with significant different properties, namely:

(i) high data throughput with highly mobile devices;

(ii) low-energy consumption and long lived sensor-based services; and (iii) extremely low latency and high reliability services.

From the industry point of view, 5G will not only provide traditional voice and data services but also expand and penetrate to other industries such as automotive, agriculture, city management, healthcare, energy, public transportation etc., and all these will lead to a large ecosystem which has never been experienced before.

The technical challenges for designing such a sophisticated and complicated system are tremendous and significant breakthroughs will be required both on the network side and in the radio interface. Regarding the physical layer of the radio interface, a few new techniques will be introduced in order to support aforementioned 5G requirements. One important objective of studies in 3GPP (see for example RP-160671, New SID Proposal: Study on New Radio Access Technology, NTT DOCOMO) is to investigate fundamental physical layer designs such as waveform design, basic numerology and frame structure, channel coding scheme(s) and so on to meet key 5G requirements.

As part of the physical layer design, the traditional concept of a base station which both schedules resources and houses the physical antennas for wireless communication with terminals, becomes more fluid. Terminology used with respect to 5G/NR includes "gNB" (Next generation Node B), which manages (either locally or remotely) at least one transmission point. Such a transmission point may also serve as a reception point, and is typically referred to as a TRP (Transmission/Reception Point).

At least in the longer term, it is expected that much more spectrum will be available to 5G systems in order to meet traffic demand. To date, spectrum for mobile communication has focused on frequencies below 6 GHz and typically 2 GHz or below. In the time frame of 2020 to 2030, more spectrum at higher frequencies such as around 6 GHz, 10 GHz or even up to 100 GHz will be considered. At the same time wider frequency spans will be available at these extreme higher frequency bands. More detailed information is provided in Table 1 (source: Ofcom, "Spectrum above 6 GHz for future mobile communications", February 2015).

TABLE 1

Possible spectrum allocation for 5G and beyond

| Spectrum | Possible allocation |
| --- | --- |
| 5 GHz | This band is being considered at the ITU World Radio Conference in 2015 (WRC-15) - in total over 300 MHz in new spectrum could be allocated<br>If agreed at WRC-15, a contiguous band from 5150 to 5925 MHz would be created using a combination of existing and new spectrum<br>Channel sizes likely based on current Wi-Fi use, in multiples of 20 MHz, and the band may remain as a licence-exempt band in line with current Wi-Fi |
| 15 GHz | Potentially over 500 MHz contiguous spectrum depending on the sub-band used and sharing with existing uses<br>Very high speeds are achievable - for example, peak speeds of 5 Gbps have been demonstrated already<br>Channel sizes could be very wide, for example, multiples of 100 MHz |
| 28 GHz | Similar to the 15 GHz band, for example, over contiguous 500 MHz of spectrum depending on the sub-band used and sharing with existing uses<br>Channel sizes could be very wide, for example, multiples of 100 MHz Depending on the bandwidth available, the band could accommodate multiple operators with the opportunity for companies other than established mobile operators to offer some 5G services with an assignment of 100 MHz per operator, or more, depending on national availability and sharing with existing services. |

TABLE 1-continued

Possible spectrum allocation for 5G and beyond

| Spectrum | Possible allocation |
| --- | --- |
| 60-80 GHz | Potentially up to 5 GHz of contiguous spectrum depending on the selected sub-band (for example, 71-76 MHz and/or 81-86 GHz)<br>Channel sizes could be very wide, for example, multiples of 100 MHz Depending on the bandwidth available, the band could accommodate multiple operators with the opportunity for companies other than established mobile operators to offer some 5G services with a 100 MHz assignment per operator, or more, depending on national availability and sharing with existing services. |

The radio propagation characteristics at the extreme high frequencies such as spectrum above 6 GHz, brings more challenges compared with that of spectrum at 2 GHz, which is the typical spectrum of 3G/4G. These challenges are the large path loss, poor penetration/scattering properties and possible non-existing line of light path. Despite these challenges, extreme high frequencies also have their advantages such as large bandwidth availability. Carrier spacings may be adapted to suit the bandwidth(s) available.

The possibility of using various frequency bands leads to the concept of "numerology". This is a special term used for NR to describe a set of parameters for OFDM. For example numerology 1 has a 15 KHz carrier spacing, a particular OFDM symbol period and a particular cyclic prefix length. "numerology 2" may have a 30 kHz carrier spacing, a particular OFDM symbol length (which is half of that of the numerology with 15 kHz), and also a particular different cyclic prefix length.

An advantage of high frequencies is that the size of antennas can be small, which means that a dense antenna array is more feasible to be used for extreme high frequency scenarios. With a dense antenna array, it is easy for a mobile network to exploit the benefits of beam-forming techniques. Digital beamforming and analog beamforming are two typical types of beamforming. Theoretically, the difference between them is that, at a particular time instance, analog beamforming builds a single beam using many of antennas, to cover a limited area with smaller power consumption and hardware usage; whereas digital beamforming can have multiple beams simultaneously to cover a relatively wide area with more power consumption and more hardware cost. Sometimes the network can use these two beamforming techniques together.

In the following description we generally assume that a transmit beam is formed by signals from antennas at a single TRP. However, it is possible that a beam could be provided by signals from more than one TRP. The same applies for receive beams. We also generally assume that a given TRP is associated with a particular cell, but this limitation may not apply in all systems. Note that a cell might be provided by one or more TRPs and that a given TRP might contribute to providing more than one cell.

Each individual beam has a relatively narrow angular coverage compared with a cell. Therefore, it is expected that in at least some deployments, 5G systems will employ so-called "beam sweeping". According to the basic idea, a TRP changes the angular direction of a single transmitted beam at frequent intervals and cyclically, so as to perform a complete rotation around the TRP (and in a typical arrangement thereby progressively covering the whole of a cell centered on the TRP) Rather than the beam being swept continuously, it is preferable to switch the beam direction in discrete steps between adjacent angular directions at high speed (this can be done electronically on a scale of nanoseconds, without physically rotating the antenna array). In this way the beam can dwell at each of the angular directions successively for a short period (referred to below as a "time slot", not necessarily the same as "slots" defined as part of a wider frame structure), and the time taken to switch between these positions can be negligible. Even though the overall scheme can be still be described as "beam sweeping", each discrete beam direction or position can be considered to correspond to a different beam. If a UE's access via the beam is confined to periods when the beam is directed towards the UE, the beam sweeping can be transparent to the user.

Different beams can be employed for DL and UL; unless otherwise stated, "beams" as referred to henceforth are at least DL beams. Different beams may be transmitted from the same TRP for different purposes. For example from the coverage point of view, a beam carrying PSS/SSS/PBCH could be a beam with wider coverage and a beam for data could be narrower. On the other hand using a beam purely for PSS/SSS/PBCH purposes is not efficient. There is likely to be some kind of multiplexing between PSS/SSS/PBCH and other signals through FDM (frequency-division multiplexing) or TDM (time-division multiplexing) etc.

In discussions in 3GPP on NR it was already agreed that both single beam operation and multiple beam operation should be supported by the initial access procedure. In the following, terminology and principles of operation relevant for LTE (4G) are also assumed to generally applicable for NR (5G). The NR design is assumed to be based on LTE, but with additional features and enhancements.

When a terminal (referred to in LTE as a UE or User Equipment) is switched on or completely loses a connection, it will try to connect/reconnect to a cell/node/access point. At this stage, that UE may have very limited information of the possible serving cells and the available communication system(s) and will rely on the so called initial access procedure, a fundamental physical layer procedure, to get the timing/frequency properties and identity information about any potential serving cells. As already mentioned, in LTE, PSS (primary synchronization signal), SSS (secondary synchronization signal) and PBCH (physical broadcast channel) are jointly designed to accomplish this target. Cell identity information is required by the UE as part of the information needed in order to be able to receive the PBCH. In LTE the PBCH contains sufficient common system information to be able to read some more detailed broadcast system information (e.g. SIB1, where SIB stands for System Information Block), which then enables the UE to access the cell (e.g. by transmission of PRACH (Physical Random Access Channel). Detailed information regarding the functionality and design of the PSS, SSS and PBCH in LTE can be found in the following table.

TABLE 1

Design, functionalities and information provided by PSS/SSS/PBCH in LTE

| Signal | PSS | | SSS | | PBCH |
|---|---|---|---|---|---|
| Design | Made up of a length 62 Zadoff Chu sequence which has one of three different root indices. Each root index matches to one particular identity within the cell ID group | Mapped to 72 sub carriers centered around the DC subcarrier in slot 0 (Subframe 0) and slot 10 (Subframe 5) in FDD. | Made up of a length 62 Scrambling Sequence (based on m-sequences where the choice of one of 168 sequences indicated the physical layer cell ID group) | Mapped to 72 sub carriers centered around the DC subcarrier in slot 0 (Subframe 0) and slot 10 (Subframe 5) in FDD - the sequence of SSS in subframe 0 and the one in subframe 5 are different from each other | Delivery the information for: system bandwidth; PHICH information; system frame number; number of transmit antenna through CRC mask Mapped to 72 subcarriers centered around the DC subcarrier belong to first 4 OFDMA symbols of second slot of subframe 0, excluding resource element for reference signal |
| Functionality/ information provided after detection | Detect part of cell ID (index of cell ID) group through detecting PSS sequences | Initial coarse time/frequency synchronization to PSS symbol boundary after detected time/ frequency position of PSS | Physical layer cell group identifier and subframe index (0 or 5) through detecting SSS sequences. | CP overhead (normal CP or extended CP) and frame structure type through detecting SSS time/frequency domain position | Provide fundamental information for a terminal to access the system |

In the initial access procedure in LTE a UE tries to detect the PSS signal first and identify part of cell ID (index of cell ID group) and slot timing. Then a UE will further detect the SSS to obtain the full cell ID information and other information such as CP (cyclic prefix) length, frame timing etc. With the cell ID a UE can deduce the location of the cell-specific reference signals and further decode the PBCH signal.

As mentioned above, the NR system could operate in a very high frequency spectrum region where (analog) beamforming techniques may be used to boost the coverage. A typical NR cell, provided by a gNB, may consist of one or a few TRPs (Transmission Reception Points) and each TRP may generate a few beams to provide coverage within a cell. Multiple TRPs may be controlled by a gNB. Here we consider a cell to be a geographical area where a cell ID can be determined by a terminal from transmissions by the network. In a similar way to camping on a cell in 2G/3G/4G in NR, a UE may camp on a particular beam to access the network. One UE would connect with the TRP via one beam in general.

During the initial access, even if a UE can catch the synchronization signals of multiple beams, it can be expected that that UE will select the beam with the strongest measured synchronization signal as a basis for performing the synchronization procedure. One example of the system is illustrated in FIG. 1.

FIG. 1 shows the coverage area of a gNB 20, indicated by the outer ellipse. The gNB controls two Transmission/Reception Points TRP1 and TRP2, and in this example, each of these TRPs employs beam sweeping. As illustrated in FIG. 1, different beams may be transmitted from the TRP at different times and be active according to a beam sweeping pattern controlled by the gNB. Successive beams transmitted from TRP1 are denoted B11/B1, B12/B2 and B13/B3 and those from TRP2 are denoted B21/B4, B22/B5 (the reason for these alternative numbering schemes will be explained later). In practice there may be many more beams than the few shown here. A UE 10 is in range of at least one of the beams and can therefore detect synchronization signals contained in the beams.

Such beams transmitted from a TRP are of course DL-only beams. These beams may correspond to beams for UL transmission by UEs, but this is not relevant for present purposes. Under such a multi-beam only scenario, the PSS, SSS and PBCH signal will not have omni-directional transmission, and UEs serviced by different beams will detect synchronization signals at different time instants/slots and the gap between different time instants/slots depends on the beam sweeping time used by the gNB. To deal with this new scenario in 3GPP discussions on NR, the concept of "SS block" is introduced into the NR synchronization design, where "SS" stands for synchronization signal. A SS block can consist of PSS, SSS and PBCH (or any combination thereof) and these signals can multiplexed by either TDM or FDM within a SS block. A given SS block is transmitted using a corresponding beam. Multiple SS blocks may compose one SS burst.

The simplest scenario is where there is one beam per SS block and all the beams use the same frequency but differ in the spatial domain (transmitted toward different directions). The "beam sweeping" is effectively performed by having different beams for each SS block within an SS burst. The basic assumption is that one UE just detects one of these SS blocks among the SS burst, but other ways are not precluded. If a UE detects more than one SS block (in other words detects more than one beam) it can select one beam on which to camp using predefined rules based on signal strength and/or other criteria.

A further simplifying assumption is that the duration of each beam is identical, where "duration" refers to the time period during which one UE can detect the beam. In other words both the sweep speed and the angular width of each beam as seen at the UE may be assumed to be the same for each beam. As will be apparent to those skilled in the art, these assumptions are merely for simplifying the explanation. A practical implementation may involve beams of different numbers and widths.

Multiple SS bursts can compose one "SS burst set". In this case one complete beam sweep may correspond to an SS burst set, rather than an SS burst. The relationship of SS block, SS burst and SS burst set is illustrated in FIG. 2. As shown in the upper part of the Figure, there are a succession of SS blocks transmitted, each partly occupied by PSS/SSS and PBCH. A plurality of successive SS blocks equal in number to the beams can be grouped together to form one SS burst. There may be multiple SS bursts within one SS burst set. The SS burst set may be transmitted repeatedly, for example corresponding to once per complete sweep of the available beams. In the example of FIG. 2, the left half of each SS block is empty. Data can be contained in this part of the block, in other words user data may be multiplexed with the synchronization signals. Alternatively the SS block may contain only PSS/SSS/PBCH.

In another more general scenario, the gNB could use an antenna array (with hundreds of antennas) to form multiple simultaneous beams. Here during time period 1, a gNB could form a set of x beams, each of them using SS block 1 in the time domain (these x beams will overlap in the time/frequency domain but be separated in the spatial domain). Then during time period 2, a gNB may form a set of y beams, all these beams using SS block 2 in the time domain. In this case a single SS block could correspond to a beam sweep and there could be multiple beam sweeps per SS burst.

In 3GPP RAN1 87 meeting report, Reno, USA 14th-18th November, USA, it was agreed in 3GPP that for the multi-beam case, at least the time index of the SS-block within the SS burst (referred to below as SS block index) is indicated to the UE.

The reason to indicate the SS block index is illustrated in FIG. 3, where the left hand side illustrates a Transmission/Reception Point TRP1 of a gNB 20, the outer ellipse denoting a coverage area or cell of the gNB. Using the above mentioned beam-sweeping, TRP1 transmits beams B1, B2 and B3 in time slots T1, T2 and T3 respectively and the right hand side in FIG. 3 indicates the corresponding three SS blocks, SS block 1, SS block 2 and SS block 3, where 1, 2 and 3 are the block index denoting the position of each SS block in a time sequence.

It should be noted that this example is only for illustration purposes. In practice the scenario could be much more complicated; for example the number of beams used within each individual SS burst may vary (configured by the network), or the duration of a beam may be longer than that of a SS block. The assumption is that through the use of PSS and SSS, in the end the time domain granularity for synchronization can be at the SS block level; however, within a particular SS burst, which SS block and corresponding beam is preferred may still not be known by the UE (i.e. the PSS and SSS are identified corresponding to the beam with best reception performance). With the aid of the SS block index (which may be a time index of the SS block), a UE can identify the corresponding beam with the best reception performance and this information will help a UE to build beam reciprocity; in other words the UE can select a "good" DL beam with good reception quality and set up a "good" UL beam suitable for transmission.

Compared with LTE, one new issue for NR is that it is preferable for a terminal to identify a beam during initial access. Providing a beam identity (hereinafter, "beam ID") for such identification will facilitate a terminal to perform beam management functions such as switching between different beams or reporting beam measurements to the network. A terminal can identify a beam through its beam ID. Note that having one cell per beam and simply expanding the total number of cell IDs to be indicated by PSS/SSS from that in LTE may not be feasible, since this would lead to blind detection of a very large number of different sequences. Therefore, use of a beam ID, distinct from cell ID, seems indispensable. Consequently, a problem exists of how to deliver this beam ID, bearing in mind the operation of PSS, SSS and PBCH. In addition, multi beam operation and beam ID transmission will also impact the design of SSS and PBCH and new designs/solutions for these signals will also be needed.

SUMMARY OF THE INVENTION

Embodiments of the present invention address the design of PSS (Primary Synchronization Signal), SSS (Secondary Synchronization Signal) and PBCH (Physical Broadcast CHannel) design and provides methodologies to support single beam/multiple beam operation during the initial access intended for use in NR.

As already mentioned, during initial access in a 5G wireless communication system a terminal will try to obtain fundamental system information/identifiers which are required for its future signal transmission/reception activities. Due to the extensive usage of beamforming techniques in 5G, besides identifying a cell ID and obtaining time/frequency synchronization a terminal may be required to identify a beam ID during the initial access procedure. Embodiments of the present invention provide solutions for how to transmit a beam ID during the initial access process. In addition solutions on how to indicate SS (Synchronization Sequence) block index are also provided (e.g. for the case where there is a direct correspondence between SS block index and the beam ID(s) associated with an SS block, so that at least part of the beam ID may be determined from the SS block index). In different variations of embodiments the index of an SS block could be one of the following:

an index of an SS block within the SS blocks of a SS burst
an index of an SS block within the SS blocks of a SS burst set
a time index such as an offset of an SS block from the start of the first SS block of an SS burst or the first block of an SS burst set According to a first aspect of the present invention, there is provided a transmission method in a wireless communication system comprising:

transmitting one or more beams from a transmission point, each beam including primary and secondary synchronization signals and a broadcast channel carrying system information, and each beam having a beam identity (beam ID), wherein:

at least one of the secondary synchronization signal and the broadcast channel is used to transmit at least part of the beam ID.

The typical case would be where a beam is formed from signals transmitted from a single transmission point. However, the case is also possible where a beam could be formed by signals from multiple co-operating transmission points. The above mentioned "beam ID" is primarily intended to distinguish among multiple beams from the same transmission point(s); however, it is possible that the beam ID would still be used if only one beam is transmitted per transmission point.

It should be noted that the above "system information" here may be only a subset of a larger set of system information.

In a first embodiment, the primary synchronization signal and the broadcast channel are common to every beam and the secondary synchronization signal is used to transmit at least part of the beam ID.

In another embodiment, the primary synchronization signal and the secondary synchronization signal are common to every beam and the broadcast channel is used to transmit at least part of the beam ID.

In any method defined above, preferably the beam ID comprises a first part based on an identity associated with more than one beam, and a second part which identifies a specific beam. It should be noted that the above "identity" is associated with more than one beam, rather than necessarily being limited to the identity of the transmission point (TRP) itself, since a TRP may not have an explicit identity in NR.

Further preferably, the identity associated with more than one beam is a cell identity.

The first and second parts referred to above may both be transmitted using the secondary synchronization signal. Further, the first and second parts may be frequency-division multiplexed and/or time-division multiplexed.

In any method defined above, preferably a specific part of the system information is contained in synchronization signal (SS) blocks, each beam carries at least one respective SS block, and SS blocks of a plurality of beams form a SS burst, each SS block within a SS burst having a respective SS block index. The reference here to "a specific part" of the system information allows for different mappings of system information/parts of system information to one or more SS blocks.

The above mentioned SS block index of an SS block may be implied by at least one of:

the relationship between the primary synchronization signal and the secondary synchronization signal in the time or frequency domain;
the relationship between first and second parts of the secondary synchronization signal SSS in the time or frequency domain; and
the relationship between transmissions of different parts of the beam ID in the time or frequency domain.

In any method defined above, at least part of the beam ID may be contained in a Master Information Block of the broadcast channel.

In any method defined above, preferably, the transmission point transmits at least one beam including both a primary broadcast channel and a secondary broadcast channel, the primary broadcast channel is used to transmit system information common to more than one beam, and the secondary broadcast channel is used to transmit information specific to a beam including at least part of the beam ID.

In any method defined above, the transmission point may further transmit at least one beam including a reference signal for demodulating the broadcast channel, which reference signal is independent of the beam ID and/or independent of an identity associated with more than one beam.

According to a second aspect of the present invention, there is provided a transmission point in a wireless communication system, the transmission point arranged to transmit one or more beams, each beam including primary and secondary synchronization signals and a broadcast channel carrying system information, and each beam having a beam ID, wherein at least one of the secondary synchronization signal and the broadcast channel is used to transmit at least part of the beam ID.

According to a third aspect of the present invention, there is provided a station (e.g., terminal) in a wireless communication system, arranged for detecting one or more beams transmitted by a transmission point, each beam including primary and secondary synchronization signals and a broadcast channel carrying system information, and each beam having a beam ID, wherein at least one of the secondary synchronization signal and the broadcast channel is used to transmit at least part of the beam ID, and the station is arranged to access a wireless network by detecting a said beam and obtaining its beam ID.

According to a fourth aspect of the present invention, there is provided a wireless communication system comprising a transmission point and a station for receiving signals from the transmission point, the transmission point arranged to transmit one or more beams, each beam including primary and secondary synchronization signals and a broadcast channel carrying system information, and each beam having a beam ID, wherein at least one of the secondary synchronization signal and the broadcast channel is used to transmit at least part of the beam ID, and the station is arranged to access a wireless network by detecting a said beam and obtaining its beam ID.

The above transmission point, station and wireless communication system may include any of the features of the method outlined above.

Further aspects of the present invention provide computer-readable code which configures a station in a wireless communication system to perform any method as defined above, as well as a non-transitory computer-readable recording media carrying such code.

As will be apparent from the above, embodiments of the present invention are relevant to radio beamforming transmissions from base stations which promise significant capacity, power consumption, spectral efficiency and interference improvement in cellular systems.

Embodiments propose a radio signalling scheme between Base Station and Mobile Terminal for:—
(1) how to transmit beam ID
(2) how to transmit the index of an SS block The proposed scheme is relatively simple in terms of signalling protocol and associated processing and efficient in terms of spectrum overhead due to signalling overhead and power consumption. In particular, a feature of the proposed scheme is to transmit a beam ID or part of a beam ID through SSS or PBCH signal, by joint design of SSS and PBCH.

As will be apparent from the above, embodiments of the present invention include:
- a communication system with multi-beam/single-beam transmission to transmit system information, comprising:
  - Defining a beam ID for each beam
  - wherein one or more of SSS or PBCH is used to transmit at least part of the beam ID
- Optional features in embodiments include:
- Using SSS to transmit the beam ID (for the case when identical PSS and PBCH are transmitted at either cell level or beam level)
- Using PBCH to transmit the beam ID (for the case when identical PSS and SSS are transmitted at either cell level and beam level)
- SSS may be divided into two parts whereas the first part transmits part of cell ID information similarly to the procedure in LTE and the second part may transmit beam ID.
- The first part of SSS and the second part of SSS may be multiplexed using one or both FDM or TDM
- The index or time index of an SS block within one SS burst may be deduced by the relationship between PSS and SSS at the time or frequency domain; or by the relationship between the first part of SSS and the second part of SSS in the time/frequency domain
- In the case of an additional channel as a secondary broadcast channel, the primary broadcast channel may transmit cell dependent system information and the secondary broadcast channel may transmit beam ID and beam dependent information.
- The index or time index of an SS block within one SS burst may be deduced by the relationship between transmissions of different parts of the beam ID in the time/frequency domain
- The reference signal for PBCH demodulation is independent of at least one of cell ID or beam ID information indicated by SSS
- The reference signal for PBCH is only transmitted within the bandwidth of PBCH in the frequency domain and within the transmission duration of PBCH in the time domain.
- The reference signal is constructed based on Gold sequences using the cell group identifier as the initial value.
- A frequency shift of PBCH DM RS is based on the cell group identifier In general, and unless there is a clear intention to the contrary, features described with respect to one aspect of the invention may be applied equally and in any combination to any other aspect, even if such a combination is not explicitly mentioned or described herein.

The "station" referred to above will be typically, but not necessarily, a terminal. Such a terminal may take the form of a user equipment (UE), subscriber station (SS), or a mobile station (MS), or any other suitable fixed-position or movable form. For the purpose of visualising the invention, it may be convenient to imagine the terminal as a mobile handset (and in many instances at least some of the terminals will comprise mobile handsets), however no limitation is to be implied from this. Other possible forms of "station" include a mobile relay station for example.

BRIEF DESCRIPTION OF THE DRAWINGS

Reference is made, by way of example only, to the accompanying drawings in which:

FIG. 3 illustrates the relationship between beam sweeping and a SS block index;

FIG. 4 is a flowchart of operations at a gNB in embodiments of the present invention;

FIG. 5 is a flowchart of operations at a terminal (UE) in embodiments of the present invention;

DETAILED DESCRIPTION

Figure 1:
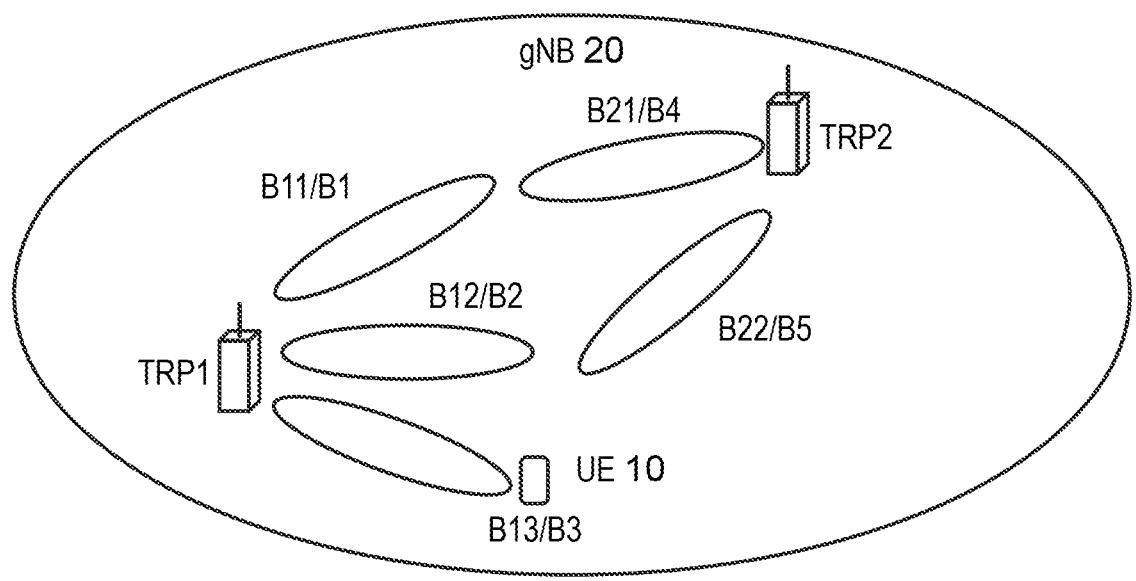
FIG. 1 illustrates a NR cell with beamforming operation in a 5G wireless communication system.

When a terminal is switched on or completely loses a connection, it will typically try to connect/reconnect to a cell. At this stage that terminal may have very limited information of the possible serving cells and the local communication system(s) and will rely on a cell search/synchronization procedure, a fundamental physical layer procedure, to get the timing/frequency properties and identity information of any potential serving cells. With this information at hand, that terminal can further exploit other important system information and finish its initial access to a serving cell (e.g. by initiating a random access procedure). The following table provides a list of the main factors which should be considered during the design of the cell search/synchronization procedure.

TABLE 1

Parameters impacting the performance of the synchronization procedure

| Parameter | Design considerations | LTE design |
|---|---|---|
| Channel raster | The carrier central frequency must be a multiple of channel raster, a trade-off between fine tuning possibilities (to be able to position a carrier with fine resolution) and implementation limitations in searching for a large number of candidate centre frequencies. | 100 kHz The same value is also used in UMTS |
| Number of synchronization sequences | A larger number of sequences allows more information to be indicated by the choice of sequence (e.g. cell ID) | Two stage synchronization procedure based on PSS and SSS, reducing the total number of different candidate sequences to be processed. The transmitted PSS and SSS sequences together indicate the cell ID |
| Synchronization signal sequence design | Good autocorrelation and cross-correlation properties to allow overlapping sequences to be distinguished Sequence length is a compromise between detection performance, detection complexity and resource usage | PSS signal is constructed based on Zadoff-Chu sequence. SSS signal is based on M sequences. |
| Frequency and time domain location of the synchronization signal | This may be a compromise between minimising the number of possible locations to search and controlling the interference between different synchronization signals. The density of synchronisation signal transmission in the time domain should be sufficient to allow reasonable cell search within a reasonable amount of time, and to track possible changes in the channel time delay (e.g. due to UE mobility). | Frequency domain location is fixed, PSS and SSS are transmitted in the central 6 resource blocks of a carrier. Transmitted periodically, twice per radio frame (10 ms), the location of PSS and SSS are fixed within each radio frame With fixed locations in the time and frequency domains, sequences from synchronised cells will overlap and distinguishing different sequences relies on the number of different sequences and their correlation properties. |
| Resources occupied by synchronisation signals | Longer synchronisation sequences are easier to detect and can support a larger number of different sequences, but this would use more time/frequency resource | With fixed locations in the time and frequency domains, sequences from synchronised cells will overlap, but this uses less time/frequency resource. |
| Relationship of synchronisation signals to other signals | Once synchronization sequences for a cell are detected by a UE, it needs to be able to identify the location/characteristics of other signals, for example common reference signals and PBCH (broadcast channel carrying basic system information) | When PSS and SSS are received the UE knows cell ID, carrier centre frequency and subframe timing. This information is required for reception of PBCH. |

The above parameters need to be jointly considered during the synchronization procedure design. For example if we consider a two-step synchronization procedure, then one solution is to have both PSS and SSS, as in the current LTE synchronization procedure. Considering the aforementioned spectrum allocation for 5G and compared with the spectrum usage situation of LTE, the following items should be considered when determine whether to reuse the LTE synchronization procedure or design a new synchronization procedure for 5G systems.

Firstly, as already mentioned the bandwidth of 5G could be much larger compared with the design target of 20 MHz transmission bandwidth of LTE. Without any help from some prior information the receiver would potentially need to check all possible carrier frequencies on the carrier raster. In general, the number of possible raster locations in a given frequency band (supporting a few carriers) could be proportional to the transmission bandwidth multiplied by number of possible carriers, divided by the frequency raster. For 5 carriers in LTE this number could be something like 5×20/0.1=1000. Assuming a total bandwidth in 5G/NR of some multiple of 100 MHz this number could be much higher (e.g. 10×100/0.1=10000 assuming 10 carriers), and the implementation complexity and the tuning time when searching the whole bandwidth will be significantly increased compared with LTE using a 100 kHz channel raster. In addition, the introduction of NR/5G is likely to increase the number of possible frequency bands which should be searched for synchronisation sequences. Thus it is desirable that the frequency raster for detection of PSS and SSS can be coarser in 5G/NR than in LTE, at least for wide frequency bands.

Secondly, the carrier frequency of 5G/NR could be much higher compared with the LTE carrier frequency. The path loss when using these higher carrier frequencies is increased, which will limit/reduce the size of a cell. Smaller cells imply fewer users per cell, and with a larger bandwidth it will be possible to use more resources in the frequency domain to accommodate the synchronization signals (e.g. by use of different frequencies), which will make it possible to reduce the interference between synchronization signals from different cells.

The invention will be described with reference to embodiments based on a 5G/NR system which is assumed to share many characteristics with LTE, and to have the basic architecture shown in FIG. 1 with a UE 10 and gNB 20.

FIG. 4 is a flowchart of operations in the gNB 20, and FIG. 5 shows the corresponding operations at the UE 10.

The process at the gNB 20 begins at step S100 with the gNB configuring beams for a TRP under its control. Each beam has a beam ID which is constructed in one of a number of ways to be described. The beam ID distinguishes each beam from other beams transmitted by the same TRP. The beams may be beams transmitted using beam sweeping as already mentioned, though this is not essential. Each beam is also configured with PSS.

In S102 the gNB 20 constructs SSS and PBCH for transmission via each of the beams, The beam ID may be contained or indicated in SSS or PBCH as explained below. Thus, constructing at least one of SSS and PBCH for a beam involves use of the beam ID.

In S104 the beams configured by the preceding steps are transmitted, for example by a TRP. Thus, in the case of beam sweeping, a UE 10 at a given location will detect a plurality of beams in sequence, and may select one beam with which to gain access to the network as described below.

Then, in step S106 the gNB 20 receives, for example via the TRP, an access request from the terminal and negotiates with the terminal for providing access to the wireless network. The details of the network entry procedure are outside the scope of the present discussion but it may be assumed that the procedure will resemble that used in LTE.

FIG. 5 summarises the corresponding operations on the UE side. In S200 the UE 10 detects a beam transmitted from a TRP. If a plurality of beams are transmitted using beam sweeping, and each beam corresponds to one SS block (and vice versa) the UE will be exposed to a SS burst including respective SS blocks for each beam, as already mentioned. If the UE can detect the PSS contained in one or more such SS block, in step S202 the UE 10 selects the "best" SS block in the case that more than one SS block is detected, which selection is based on rules configured in the UE 10. Selecting the SS block also has the effect of selecting a "best" beam. In step S204, the detection of the SS block (or selected SS block) is used to obtain timing information and decode SSS and PBCH. As already mentioned, at least one SSS and PBCH contains the beam ID. From this, in step S206, the UE can identify a beam with which it can connect. In step S208, the UE performs a network entry procedure to gain access to the wireless network via the selected beam. This may involve transmitting uplink signals via the selected beam or (possibly) on a different but associated beam.

Specific embodiments of the present invention will now be explained in more detail.

First Embodiment

Based on the assumption that an identical PBCH is transmitted by each beam, a first embodiment is to use SSS to transmit the beam ID. As variations of this embodiment the beam ID may be constructed in different ways, for example:—
(a) A unique beam ID is defined for each beam provided by a gNB, independent of the cell. For example in FIG. 1 the beams from TRP 1 are numbered B1, B2 and B3 and those from TRP2 continue the same numbering sequence as B4 and B5.
(b) A beam ID is composed of its cell identity plus its beam identity within the cell. For example in FIG. 1 the second beam from TRP1 may be expressed as Bc2 where c is the cell ID. In the case a subset of the unique beams available in the system may be associated with a particular cell (or vice versa).
(c) A beam ID is composed of its TRP identity plus its beam identity within this TRP. For example in FIG. 1 the second beam from TRP1 may be expressed as B12 where in beam ID Bxy, x represents the number of TRP from which that beam comes and y represents the beam number from the corresponding TRP.

The difference is in the numbering scheme; option (b) and (c) can provide additional information compared with (a). In either case the beam ID may be divided into two parts and transmitted by different signals. In the case of (b), for example if a beam ID is 31 bits in length, it is possible to transmit a first part with a first signal and transmit the second part with a second signal. How to define the two parts may be specified in the system specification, hence a UE can know how to reconstruct the whole beam ID after detecting those two parts.

Transmitting the two parts by different signals, for example SSS and PBCH within a single SS block, has the advantage that the number of possible sequences which must be detected in each part is much less than would be needed if a single SSS were used to transmit both cell and beam ID. In particular for options (b) and (c), one part may identify the cell/TRP and another part may identify the beam. From the terminal point of view, a terminal can identify the cell/TRP corresponding to the beam with options (b) and (c) whereas with option (a) a TRP is transparent to a terminal even after obtaining beam ID information.

A concrete implementation of the first embodiment is to divide the SSS signal into two parts. According to option (a) above the first part will provide cell ID identification and frame timing functionality similarly to that in LTE. (It should be noted that 5G is expected to employ a frame structure similar to that used in LTE). There is no need for the frame timing to be linked to the beam sweeping speed, although there may be a relationship. The second part of SSS may provide the beam ID. The sequence used for the second part could be based on sequences such as the m-sequences mentioned in the introduction, and the ID may be used as an initialisation or other parameter to generate the corresponding sequence.

In order to minimize the number of hypotheses required to detect the SSS signal, the first part of SSS may have a fixed relationship with PSS in both time and frequency domain, similarly to what is done in LTE. This relationship may be linked to the time duration of a beam, but need not be. Then the second part of the SSS may also have a fixed relationship with the first part of the SSS in both time and frequency domains, which implies it also has a fixed relationship with PSS. Alternatively these two parts may be related using either one of frequency-division multiplexing (FDM) or time-division multiplexing (TDM).

Some possible configurations are illustrated in FIGS. 4 and 5, which show an allocation of resources within a single beam. The time axis shows the possible relationship between PSS and SSS within one SS block. PBCH is not shown here, but It is very likely that the PBCH in NR will be fitted around (or after) PSS/SSS through TDM.

Figure 6:
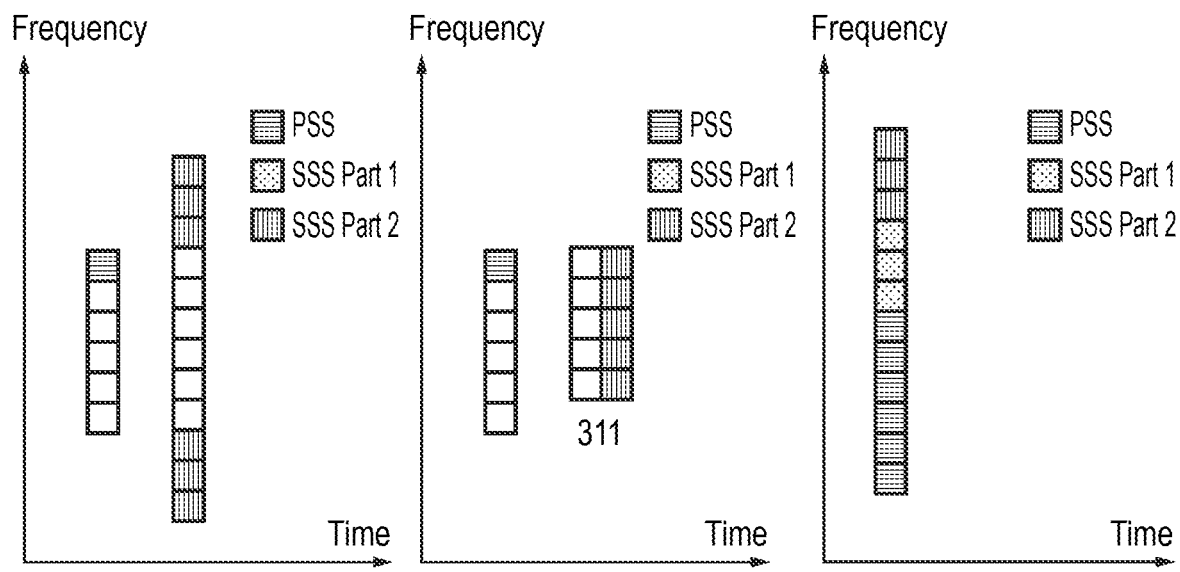
FIG. 6 shows possible configurations of PSS and SSS in an embodiment of the present invention.

FIG. 6 shows three example arrangements of a SS block. As shown in FIG. 6, the first part of SSS and second part of SSS may be multiplexed with either FDM or TDM. In the first (left-hand) example, PSS is transmitted first then the parts of SSS are transmitted together in the time domain but separated in frequency, with SSS Part 1 occupying the same frequency range as PSS. In the second (middle) example, the two parts of SSS occupy the same frequency range, again the same as occupied by PSS, but are transmitted at different times respectively; whilst the third (right-hand) example is like the first but SSS is now transmitted at the same time as PSS, in other words a fully FDM multiplexed mode between PSS and SSS.

Thus the location of PSS and the first part of SSS may be the same in the frequency domain, the separation in the time domain may be pre-defined, or it may be consecutive as in LTE. Since there is a fixed relationship between PSS and the first part of SSS in both frequency and time domains, provided that the generation of the first part of SSS is the same as in LTE, the detection hypotheses for the first part of the SSS are also the same as that in LTE.

Figure 7:
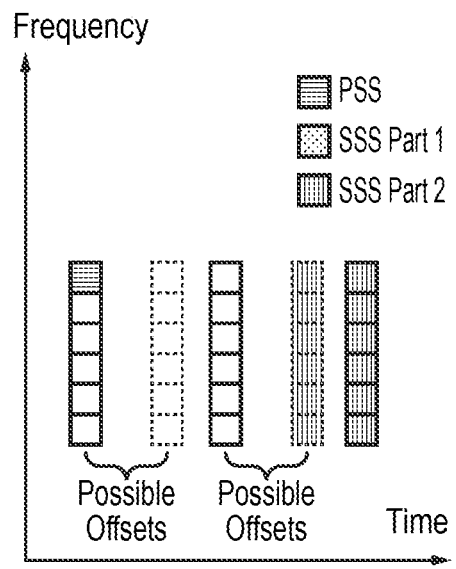
FIG. 7 shows another example configuration of PSS and SSS in which offsets are employed.

As illustrated in FIG. 7, as an alternative to a fixed time/frequency relationship between PSS and SSS parts, there could be a small number of possible relationships (e.g. a small set of time/frequency offsets, where the exact offset is blindly detected). Using this approach the particular offset could indicate at least part of the beam ID or cell ID.

As mentioned in the introduction, the SS block index is required to be transmitted to the UE. In a further embodiment the SS block index may be implied by the time/frequency relationship between PSS and SSS, or by the time/frequency relationship between the first part of SSS and the second part of SSS. For example when the index of an SS block within one SS burst is 1, the time separation between PSS and SSS could be 1 OFDM symbol. Within the next SS block (index 2), the separation would be 2 OFDM symbols, and so on. Alternatively the separation between the first part of SSS and the second part of SSS could be 1 OFDM symbol.

A similar method may also be applied in the frequency domain, for example the 1 subcarrier separation between the first part of SSS and second part of SSS may indicate time index 1. In this way the SS block index can be deduced from the detection of SSS, at the cost of an increasing number of hypotheses. The total number of different offsets within each SS block could be the same as the number of beams formed, to ensure that the transmission of the synchronization signal provides coverage in every direction. Besides providing a way to indicate the index or time index of each SS block within a particular SS burst, this method is also suitable for the scenario where beams deployed for a SS burst are flexibly configured by the network.

Second Embodiment

As already mentioned, conventionally, in LTE a UE needs its cell ID to deduce the location of the reference symbols embedded in the PBCH signal. A UE will further use the cell ID to decode these reference symbols, and then it can further decode the PBCH signal. A second embodiment of the present invention, which may be an extension of the first embodiment, employs special, cell ID independent, or partially cell ID independent, reference signals, and the PBCH signal is decoded based on these reference signals. Then a UE can decode PBCH signal without the knowledge (or full knowledge) of the cell ID, although the cell ID could still be transmitted on every beam. In this way, cell ID decoding can be decoupled from PBCH decoding in order to provide more design flexibility and ensure forward compatibility.

To implement this embodiment, one solution is to introduce special demodulation reference signals (which we denote here as "PBCH DM RS") for PBCH decoding. With this solution, and if the PBCH construction process is also independent, or partially independent, of cell ID, then non-identical PBCH may be transmitted on different beams. This will allow PBCH to carry beam dependent information. Such PBCH DM RS may be embedded within PBCH in the same way as is already done for cell-specific reference signals (CRS) in LTE, as illustrated in the time/frequency grid of FIG. 8.

Figure 8:
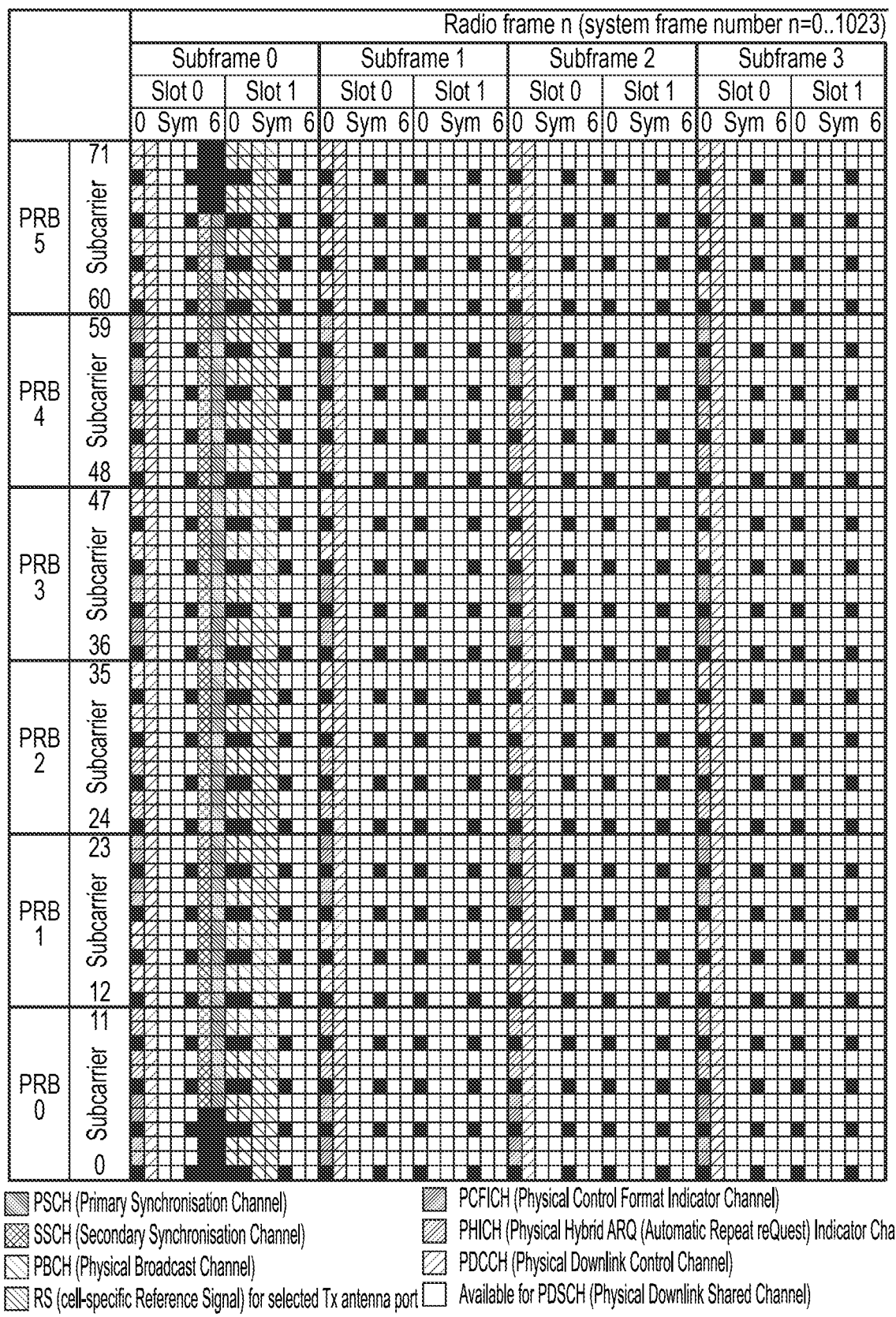
FIG. 8 shows a time/frequency grid showing resource allocation in LTE, capable of being adapted for use in the present invention.
Figure 8:
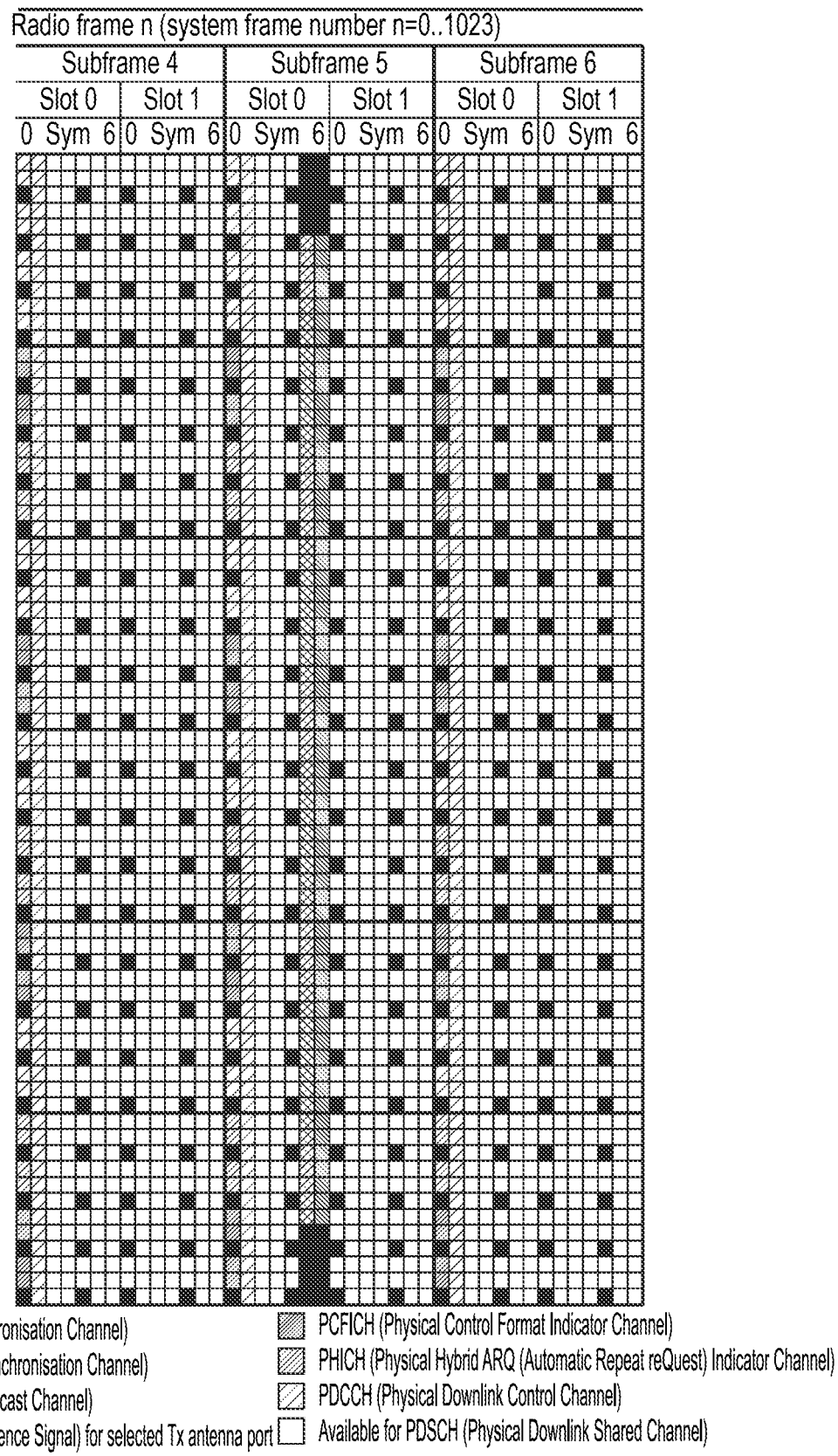
Figure 8:
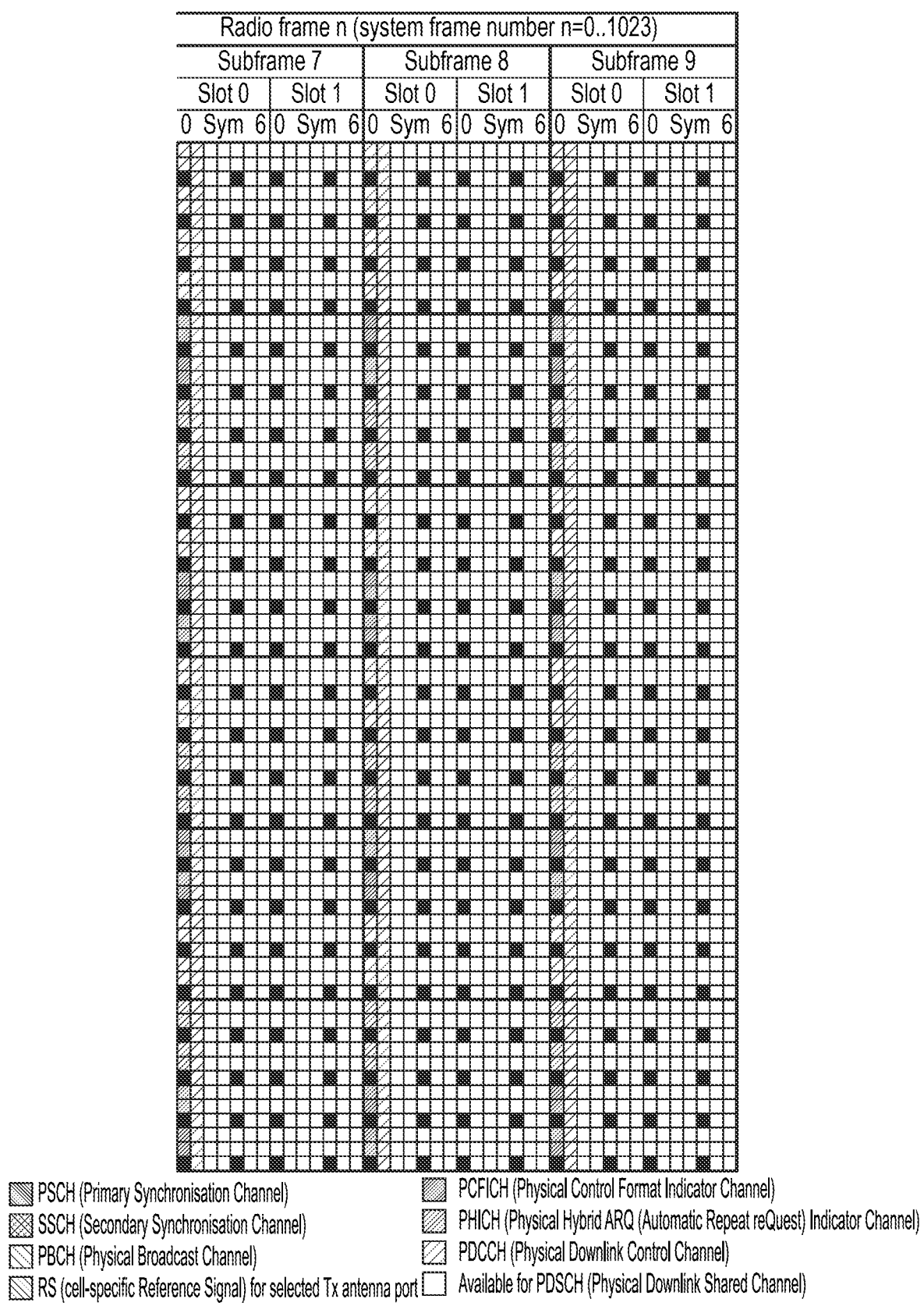

In FIG. 8, the horizontal direction represents time in units of subframes, slots and OFDM symbols, whilst the vertical direction represents frequency in units of PRBs (Physical Resource Blocks) and subcarriers. The small squares indicate individual time/frequency locations (each corresponding to a single slot and subcarrier), and of these, the black squares are resources allocated to the cell-specific reference signals. Shaded portions as specified in the legend below the Figure, represent resources occupied by various LTE channels. Of these, the set of resources which occupies the final symbol in slot 0 of each of subframes 0 and 5, over all subcarriers, is reserved for PBCH. Parts of PRB 0 and 5 within this set of resources is occupied by reference signals, and at least some of these locations may also be used for the proposed new PBCH DM RS. In NR it is likely that PBCH will be time-division multiplexed with PSS/SSS. Other channels identified in FIG. 8 are not relevant for present purposes, and can therefore be ignored.

Regarding the PBCH DM RS design, unlike the CRS in LTE which exists in the whole transmission bandwidth of a carrier, the maximum spread of the PBCH DM RS in the frequency domain may be limited to the transmission bandwidth of PBCH signal. In the time domain the PBCH DM RS may be allocated according to pre-defined patterns within the transmission duration of PBCH in a SS block. As an example, the generation of the PBCH DM RS may be based on Gold sequences and the cell group identifier may be used as the initial value for different Gold sequences. This means that the reception of PBCH would be partly dependent on the cell ID (since the cell group identifier is part of the cell ID).

In the time and frequency domains, the location of PBCH DM RS may be allocated based on pre-defined patterns for each antenna port (e.g. if PBCH is transmitted using more than one antenna port). In addition at the frequency domain, the frequency shift of PBCH DM RS may also be based on the identifier within a cell identity group, for example three different shift positions are available if the total number of the identifiers within a cell identity group is 3.

To explain further, In LTE the reference symbols (including the reference symbols within PBCH region) may be shifted at the frequency domain to reduce interference. The number of possible shifts are determined by cell identity group. To keep the same frequency diversity gain as LTE, the same principle may be applied to the new PBCH DM RS, i.e., the number of possible shifts of the reference symbols at the frequency domain is the same as that of LTE. In LTE the total number of identifiers within a cell-identity group is 3; however, in NR the value may be increased if the range of cell ID values needs to be extended.

In a variation of this embodiment the details of PBCH DM RS could depend on the Beam ID of the beam used for transmission of the particular instance of PBCH.

In a further variation of this embodiment the details of PBCH DM RS could depend on the TRP ID used for transmission of the particular instance of PBCH.

Third Embodiment

The third embodiment is to transmit beam ID by using PBCH. This is primarily envisaged as an alternative to the first embodiment, although it might be possible to combine both embodiments for providing beam ID redundantly (e.g. providing a cross-check of correct reception), or to use the different embodiments to transmit different parts of a beam ID. It was agreed in the above mentioned 3GPP RAN1 87 meeting report, Reno, USA 14th-18th November, USA that the NR PBCH is a non-scheduled broadcast channel carrying at least a part of minimum system information with fixed payload size and periodicity predefined in the specification depending on carrier frequency range. However what information can be classified as minimum system information is still under investigation. A concrete implementation is to include beam ID information in the PBCH information. In LTE the MIB, which is the message transmitted by PBCH, consists of 24 bits where there are 10 spare bits for future use. Using a similar design for NR, the spare bits could be used for beam ID or the MIB payload may be further increased and some of the extra bits may be used to represent a beam ID.

It was also agreed that NR can define an additional channel as the secondary broadcast channel. The motivation for such a secondary broadcast channel is that the amount of essential system information is large, hence transmitting all of them through PBCH channel may not be efficient. One possibility is to provide two broadcast channels where the more important part of the essential system information is transmitted through a primary broadcast channel (first PBCH channel) whereas the other parts are transmitted by a secondary broadcast channel. The secondary channel may have more configurable flexibility compared with the first PBCH channel. Both channels may be transmitted in the same frequency band and may also be transmitted via the same beam.

Figure 2:
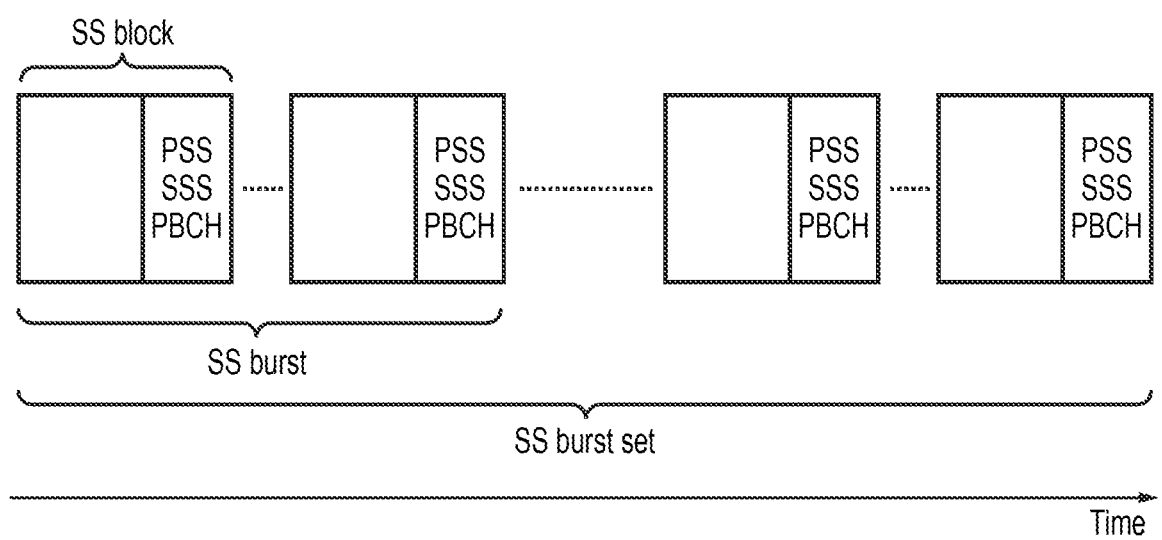
FIG. 2 shows the relationship of a SS block to a SS burst and SS set.

One implementation of the third embodiment is to use the secondary broadcast channel to transmit the beam ID (or part of the beam ID). The advantage of this implementation is that the first broadcast channel can be cell-specific and used to transmit beam-independent system information, whereas all beam-dependent system information can be transmitted by the secondary beam-specific broadcast channel. A structure like that shown in FIG. 2 may still be used for this scenario, i.e., two broadcast channels are configured. As an example, two PBCHs (e.g. PBCH1 and PBCH2) could be transmitted where only PBCH is indicated in FIG. 2. Under a multi-beam operation environment, the content of the first cell-specific PBCH channel may simply be repeated within each SS block.

Figure 9:
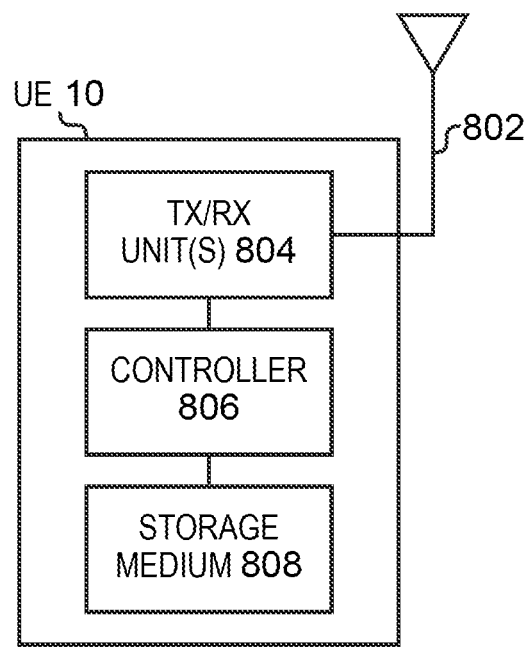
FIG. 9 is a schematic block diagram of a terminal to which the present invention may be applied.

FIG. 9 is a block diagram illustrating an example of a terminal 10 to which the present invention may be applied. The terminal 10 may include any type of device which may be used in a wireless communication system described above and may include cellular (or cell) phones (including smartphones), personal digital assistants (PDAs) with mobile communication capabilities, laptops or computer systems with mobile communication components, and/or any device that is operable to communicate wirelessly. The terminal 10 includes transmitter/receiver unit(s) 804 connected to at least one antenna 802 (together defining a communication unit) and a controller 806 having access to memory in the form of a storage medium 808. The controller 806 may be, for example, a microprocessor, digital signal processor (DSP), application-specific integrated circuit (ASIC), field-programmable gate array (FPGA), or other logic circuitry programmed or otherwise configured to perform the various functions described above, including performing the network entry procedure shown in FIG. 5. For example, the various functions described above may be embodied in the form of a computer program stored in the storage medium 808 and executed by the controller 806. The transmission/reception unit 804 is arranged, under control of the controller 806, to receive SS blocks, detect synchronization signals of beams, and subsequently to decode PBCH as discussed previously. The storage medium 808 stores the synchronization information so obtained.

Figure 10:
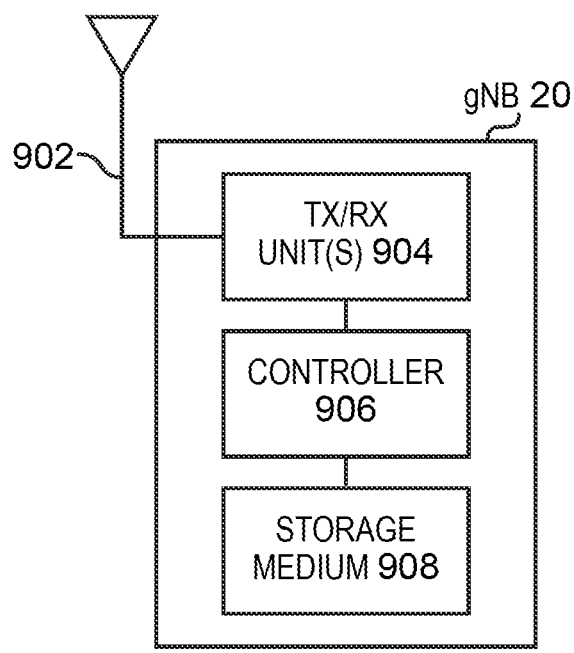
FIG. 10 is a schematic block diagram of a base station to which the present invention may be applied.

FIG. 10 is a block diagram illustrating an example of an gNB 20 responsible for one or more cells. The base station includes transmitter/receiver unit(s) 904 connected to at least one antenna 902 (together defining a communication unit) and a controller 906. The controller may be, for example, a microprocessor, DSP, ASIC, FPGA, or other logic circuitry programmed or otherwise configured to perform the various functions described above including the operations shown in FIG. 4. For example, the various functions described above may be embodied in the form of a computer program stored in the storage medium 908 and executed by the controller 906. The transmission/reception unit 904 is responsible for broadcasting synchronization signals, PBCH and so forth, under control of the controller 906.

Thus, to summarise, embodiments of the present invention provide a method in a 5G wireless communication system to transmit a beam ID or part of a beam ID by joint design of SSS and PBCH signal. Due to the extensive usage of beamforming techniques in 5G, besides identifying a cell ID and obtaining time/frequency synchronization, the terminal 10 may be required to identify a beam ID during the initial access procedure. Therefore, a beam ID is transmitted as part of synchronization signals (SS) broadcast by a gNB 20, more particularly as part of a secondary synchronization sequence (SSS) or as part of a Physical Broadcast Channel (PBCH). The synchronization signals may be transmitted as a set of SS blocks, each having an index or time index for facilitating identification.

Various modifications are possible within the scope of the present invention.

As already mentioned, embodiments of the present invention involve synchronization signals broadcast or transmitted by a cell in order to enable terminals to become synchronized. A known example of such signals from LTE is the above mentioned PSS/SSS. However, the present invention is not necessarily limited to PSS/SSS as these terms are understood in the context of LTE. Other types of signal employed in a LTE and 5G systems might also be applicable to the present invention.

The invention is equally applicable to FDD and TDD systems, and to mixed TDD/FDD implementations (i.e., not restricted to cells of the same FDD/TDD type).

The present invention targets a multiple beam system. For a single beam scenario, the same mechanism may still be used from a compatibility point of view, even if no other benefits are necessarily obtained.

Although the present invention relates to beams carrying any or all of PSS/SSS/PBCH, it is possible that there may be other beams from a transmission point which do not carry PSS/SSS/PBCH, in which case the present invention may still be used but would not apply to such other beams.

In any of the aspects or embodiments of the invention described above, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein.

A computer program embodying the invention may be stored on a computer-readable medium, or it may, for example, be in the form of a signal such as a downloadable data signal provided from an Internet website, or it may be in any other form.

It is to be clearly understood that various changes and/or modifications may be made to the particular embodiment just described without departing from the scope of the claims.

INDUSTRIAL APPLICABILITY

The invention is relevant to radio beamforming transmissions from transmission points which promises significant capacity, power consumption, spectral efficiency and interference improvement in cellular systems. The proposed scheme is relatively simple in terms of signalling protocol and associated processing and efficient in terms of spectrum overhead due to signalling overhead and power consumption.

What is claimed is:

1. A transmission method in a wireless communication system comprising:
   transmitting using one or more beams from a transmission point apparatus, wherein:
   a signal transmitted on each beam of the one or more beams includes a synchronization signal block (SSB) comprising: a primary synchronization signal; a secondary synchronization signal; and a first broadcast channel carrying system information,
   a signal transmitted on one single beam of the one or more beams includes both the first broadcast channel and a second broadcast channel carrying at least a part of information identifying the beam,
   each beam of the one or more beams is identified by an index of the SSB of each beam denoting a position in each time sequence,
   the primary synchronization signal and the secondary synchronization signal are identical in every beam of the one or more beams, and
   a reference signal for demodulating the first broadcast channel is transmitted only within a bandwidth of the first broadcast channel in a frequency domain and only within a transmission duration of the first broadcast channel in a time domain.

2. The method according to claim 1, wherein the primary synchronization signal and the first broadcast channel are identical in every beam of the one or more beams and the secondary synchronization signal is used to transmit at least a part of the information identifying the beam.

3. The method according to claim 1, wherein the primary synchronization signal and the secondary synchronization signal are identical in every beam of the one or more beams and the first broadcast channel is used to transmit at least a part of the information identifying the beam.

4. The method according to claim 1, wherein an identity of the beam comprises a first part based on an identity associated with more than one beam, and a second part which identifies a specific beam.

5. The method according to claim 4, where the identity associated with more than one beam is a cell identity.

6. The method according to claim 4, wherein the first and second parts are both transmitted using the secondary synchronization signal.

7. The method according to claim 6, wherein the first and second parts are at least one of frequency-division multiplexed and time-division multiplexed.

8. The method according to claim 1, wherein a specific part of the system information is contained in synchronization signal (SS) blocks, each beam carries at least one of the respective SS blocks, and the SS blocks of a plurality of beams form a SS burst, each of the SS blocks within the SS burst having a respective SS block index.

9. The method according to claim 8, wherein the respective SS block index of an SS block is implied by at least one of:
   a relationship between the primary synchronization signal and the secondary synchronization signal in the time or frequency domain;
   a relationship between first and second parts of the secondary synchronization signal in the time or frequency domain; and
   a relationship between transmissions of different parts of an identity of the beam in the time or frequency domain.

10. The method according to claim 1, wherein at least a part of the information identifying the beam is contained in a Master Information Block of the first broadcast channel.

11. The method according to claim 1, wherein the transmission point apparatus transmits the one or more beams including both the first broadcast channel and the second broadcast channel, the first broadcast channel is used to transmit the system information identical in more than one beam, and the second broadcast channel is used to transmit information specific to a beam including the at least a part of the information identifying the beam.

12. The method according to claim 1, wherein the transmission point apparatus further transmits at least one beam of the one or more beams including the reference signal for demodulating the first broadcast channel, wherein the reference signal is independent of an identity of the beam and/or independent of an identity associated with more than one beam.

13. A transmission point apparatus in a wireless communication system,
   the transmission point apparatus comprising:
      a transmitter, the transmitter arranged to transmit using one or more beams, wherein:
      a signal transmitted on each beam of the one or more beams includes a synchronization signal block (SSB) comprising: a primary synchronization signal; a secondary synchronization signal; and a first broadcast channel carrying system information,
      a signal transmitted on one single beam of the one or more beams includes both the first broadcast channel and a second broadcast channel carrying at least a part of information identifying the beam,
      each beam of the one or more beams is identified by an index of the SSB of each beam denoting a position in each time sequence,
      the primary synchronization signal and the secondary synchronization signal are identical in every beam of the one or more beams, and a reference signal for demodulating the first broadcast channel is transmitted only within a bandwidth of the first broadcast channel in a frequency domain and only within a transmission duration of the first broadcast channel in a time domain.

14. A station in a wireless communication system, the station comprising:

a receiver, the receiver arranged for detecting one or more beams transmitted by a transmission point apparatus, wherein:

a signal transmitted on each beam of the one or more beams includes a synchronization signal block (SSB) comprising: a primary synchronization signal; a secondary synchronization signal; and a first broadcast channel carrying system information, a signal transmitted on one single beam of the one or more beams includes both the first broadcast channel and a second broadcast channel carrying at least a part of information identifying the beam, each beam of the one or more beams is identified by an index of the SSB of each beam denoting a position in each time sequence, the primary synchronization signal and the secondary synchronization signal are identical in every beam of the one or more beams, and a reference signal for demodulating the first broadcast channel is transmitted only within a bandwidth of the first broadcast channel in a frequency domain and only within a transmission duration of the first broadcast channel in a time domain; and the station is arranged to access a wireless network by detecting a said beam and obtaining the identity of the beam.

15. A wireless communication system comprising:

a transmission point apparatus; and a station for receiving signals from the transmission point apparatus, the transmission point apparatus arranged to transmit using one or more beams, wherein:

a signal transmitted on each beam of the one or more beams includes a synchronization signal block (SSB) comprising: a primary synchronization signal; a secondary synchronization signal; and a first broadcast channel carrying system information, a signal transmitted on one single beam of the one or more beams includes both the first broadcast channel and a second broadcast channel carrying at least a part of information identifying the beam, each beam one or more beams is identified by an index of the SSB of each beam denoting a position in each time sequence, the primary synchronization signal and the secondary synchronization signal are identical in every beam of the one or more beams;

a reference signal for demodulating the first broadcast channel is transmitted only within a bandwidth of the first broadcast channel in a frequency domain and only within a transmission duration of the first broadcast channel in a time domain; and the station is arranged to access a wireless network by detecting the beam and obtaining the identity of the beam.

* * * * *